(12) United States Patent
Meher

(10) Patent No.: US 12,247,386 B2
(45) Date of Patent: Mar. 11, 2025

(54) LATCH ASSEMBLY AND A METHOD OF LATCHING A FIRST ELEMENT TO A SECOND ELEMENT

(71) Applicant: Canplas Industries Ltd., Barrie (CA)

(72) Inventor: Jack Robert Meher, Minesing (CA)

(73) Assignee: Canplas Industries Ltd., Barrie (CA)

( * ) Notice: Subject to any disclaimer, the term of this patent is extended or adjusted under 35 U.S.C. 154(b) by 1273 days.

(21) Appl. No.: 16/930,754

(22) Filed: Jul. 16, 2020

(65) Prior Publication Data
US 2021/0381217 A1    Dec. 9, 2021

(30) Foreign Application Priority Data
Jun. 5, 2020   (CA) ................................ CA 3082005

(51) Int. Cl.
*E03F 5/16*   (2006.01)
*B65D 45/20*   (2006.01)

(52) U.S. Cl.
CPC ................ *E03F 5/16* (2013.01); *B65D 45/20* (2013.01); *B65D 2543/00194* (2013.01); *B65D 2543/00574* (2013.01)

(58) Field of Classification Search
CPC ........... E03F 5/16; B65D 45/16; B65D 45/20; B65D 2543/00194; B65D 2543/00574
USPC ...................................................... 292/241
See application file for complete search history.

(56) References Cited

U.S. PATENT DOCUMENTS

| | | | |
|---|---|---|---|
| 286,859 A * | 10/1883 | Smith | ................... E05C 19/105 |
| | | | 292/111 |
| 510,614 A | 12/1893 | Robertson | |
| 1,615,944 A | 2/1927 | Hetrick | |
| 2,102,430 A | 12/1937 | Mcleod | |
| 2,138,985 A | 12/1938 | Seestedt et al. | |
| 2,216,300 A | 10/1940 | Shenk | |
| 2,272,912 A | 2/1942 | John | |
| 2,638,177 A | 5/1953 | Kalman | |
| 2,714,751 A | 8/1955 | Stuart et al. | |
| 2,767,008 A | 10/1956 | Oswald | |
| 2,825,422 A | 3/1958 | Schoenfeld | |

(Continued)

FOREIGN PATENT DOCUMENTS

| | | |
|---|---|---|
| CA | 2299134 A1 | 8/2001 |
| CA | 2672865 A1 | 8/2001 |

*Primary Examiner* — Eugene G Byrd
*Assistant Examiner* — James Edward Ignaczewski
(74) *Attorney, Agent, or Firm* — Budzyn IP Law, LLC

(57) ABSTRACT

A latch assembly having first and second parts for association with first and second elements, respectively. The first and second parts are configured to cooperate to releasably secure the first element to the second element. The first part has a latch member for releasably engaging a catch member on the second part when the latch member is manipulated from an unlatched configuration to a latched configuration. A latch member holder associated with the first part is adapted to hold the latch member while allowing the latch member to pivot about a pivot axis, and slide along a sliding axis which is perpendicular to said pivot axis. The latch member is manipulable into the latched configuration in a predetermined range of contiguous positions relative to the latch member holder along the sliding axis. A method of releasably securing the first element to the second element is also disclosed.

40 Claims, 13 Drawing Sheets

(56) References Cited

U.S. PATENT DOCUMENTS

| | | | | |
|---|---|---|---|---|
| 2,847,239 A | * | 8/1958 | Wallace | E05C 5/00 |
| | | | | 292/67 |
| 3,039,837 A | * | 6/1962 | Poe | E05C 3/041 |
| | | | | 292/241 |
| 3,341,233 A | | 9/1967 | Vantine | |
| 3,560,038 A | * | 2/1971 | Gunther | E05B 15/022 |
| | | | | 292/241 |
| 3,754,656 A | | 8/1973 | Horiguchi et al. | |
| 3,847,814 A | | 11/1974 | Adachi | |
| 3,849,311 A | | 11/1974 | Jakubek | |
| 4,058,334 A | * | 11/1977 | Prather | H02B 1/06 |
| | | | | 292/241 |
| 4,059,517 A | | 11/1977 | Strahorn et al. | |
| 4,111,805 A | | 9/1978 | Pool et al. | |
| 4,132,651 A | | 1/1979 | DeJong | |
| 4,132,652 A | | 1/1979 | Anderson et al. | |
| 4,364,689 A | * | 12/1982 | Dumortier | E02D 29/1427 |
| | | | | 49/394 |
| 4,674,777 A | * | 6/1987 | Guelck | E05C 3/045 |
| | | | | 74/543 |
| 4,940,539 A | | 7/1990 | Weber | |
| 4,957,633 A | | 9/1990 | Suutarinen | |
| 5,431,826 A | | 7/1995 | Becker et al. | |
| 5,489,131 A | * | 2/1996 | Blom | E05C 3/047 |
| | | | | 292/DIG. 20 |
| 5,505,860 A | | 4/1996 | Sager | |
| 5,520,825 A | | 5/1996 | Rice | |
| 5,538,631 A | | 7/1996 | Yeh | |
| 5,637,221 A | | 6/1997 | Coyne | |
| 5,662,804 A | | 9/1997 | Dufour | |
| 6,039,362 A | * | 3/2000 | Nadherny | E05C 3/008 |
| | | | | 292/124 |
| 6,517,715 B1 | | 2/2003 | Batten et al. | |
| 7,011,752 B2 | | 3/2006 | Broeders et al. | |
| 7,300,588 B2 | | 11/2007 | Broeders et al. | |
| 7,361,282 B2 | | 4/2008 | Smullin | |
| 7,972,518 B2 | | 7/2011 | Ralph et al. | |
| 8,007,016 B2 | * | 8/2011 | Mantyla | E03F 5/16 |
| | | | | 220/4.03 |
| 8,915,380 B2 | | 12/2014 | Sowerby et al. | |
| 9,187,933 B2 | | 11/2015 | Lucas | |
| 9,415,329 B2 | | 8/2016 | Bird | |
| 9,550,686 B2 | | 1/2017 | MacDougall | |
| 2006/0284427 A1 | | 12/2006 | Borycki | |

\* cited by examiner

LATCH ASSEMBLY AND A METHOD OF LATCHING A FIRST ELEMENT TO A SECOND ELEMENT

FIELD OF THE INVENTION

The present invention relates generally to latching devices. More particularly this invention relates to a latching assembly for use in securing a cover to an open top of a container, such as a grease interceptor of the type typically used to prevent fats, oils and grease ("FOG") from entering the sanitary sewage system.

BACKGROUND OF THE INVENTION

In many food preparation facilities, such as commercial kitchens and restaurants, the sink is a major tool used for disposing of various types of food waste. In some cases liquid food wastes, such as fats, oils and grease ("FOG") are poured down the sink, and in other cases a mechanical chopper such as a garburator is used to shred the food waste as it leaves the sink and enters the wastewater system. Many food preparation establishments, such as commercial restaurants and the like, have multiple sinks for such food waste disposal.

In many jurisdictions, the disposal from commercial kitchens of FOG and FOG laden debris into the sanitary sewage system is prohibited. There are a number of reasons why this is so, including the ability of those types of materials to clog or plug sanitary sewage systems and the difficulty of adequately treating such materials in a sewage treatment facility. Therefore, many jurisdictions require that these materials be removed from the wastewater stream before permitting the wastewater stream to be added to the sanitary sewer system.

As a result, devices known as grease interceptors have been developed. These grease interceptors are connected to the wastewater effluent stream from the food preparation kitchen or other facility and are located before the sanitary sewer, typically within the kitchen. The grease interceptors may take a number of forms, but typically consist of an in-line container which is mounted at or below grade within the wastewater discharge system downstream of all of the sinks and the like. The container includes features that are configured to allow fats, oils and grease to float to the surface of the container where they can be skimmed off and physically removed for controlled disposal. In this way these wastes are removed from the wastewater before the wastewater enters the sanitary sewer system. Some examples of prior art grease interceptors include the following: Canadian Patent Nos. 2,299,134; and 2,672,865; U.S. Pat. Nos. 2,272, 912; 2,102,430; 4,940,539; 5,431,826; 7,011,752; 7,300, 588; 8,007,016; and 9,415,329.

Examples of other separators and the like include those disclosed in U.S. Pat. Nos. 2,102,430; 2,138,985; 2,216,300; 2,638,177; 2,825,422; 3,754,656; 3,847,814; 3,849,311; 4,059,517; 4,111,805; 4,132,651; 4,132,652; 4,957,633; 5,505,860; 5,520,825; 5,538,631; 5,637,221; 5,662,804; 6,517,715; 7,361,282; 7,972,518; 8,915,380; and 9,550,686.

However, a problem with conventional grease interceptors is that the cover is secured to the open top of the grease interceptor either by means of screw fasteners or quarter-turn fasteners which both have disadvantages. In the case of the screw fasteners a user must unscrew several screw-fasteners to remove the cover during periodic bailing which poses an inconvenience. While In the case of the quarter-turn fasteners the cover is more easily removed, there is another disadvantage in that the heads of the fasteners project upwardly from the floor and pose a tripping hazard or are liable to be bent or broken if stepped on.

U.S. Pat. No. 8,007,016 to Mantyla discloses an improvement over the above noted conventional means for securing the cover to the open top of the grease interceptor. Mantyla disclosed a latch assembly for securing a cover onto a container, the latch assembly comprising a catch member secured to the container transverse to a container wall at an upper end thereof, a latch member pivotally mounted to the cover adjacent an edge thereof and positioned to register with the catch member. The latch member has a hook portion and a lever portion wherein pivoting the lever portion when the cover is positioned on the container causes the hook portion to engage and disengage with the catch member.

While the Mantyla latch assembly provides various features and benefits over prior means for securing a cover to the open top of a grease interceptor, the manufacturing process requires close attention to ensure that mold variance is kept to a minimum. Otherwise, there is potential for elements of the latch assembly not aligning properly, which could result in the parts of the grease interceptor containing the misaligned elements, such as the cover, or the container, needing to be scrapped. Obviously, a larger scrap ratio leads to increased manufacturing costs.

Examples of other latching devices include those disclosed in U.S. Pat. Nos. 286,859; 510,614; 1,615,944; 2,714,751; 2,767,008; 2,847,239; 3,039,837; 3,341,233; 3,560,038; 4,364,689; 4,674,777; 6,039,362; and 9,187,933; and U.S. Pat. App. No. 2006/0284427.

Accordingly, there is a continuing need for improvements in latching systems for securing a cover to a container, generally, and for securing a cover to an open top of a grease interceptor, specifically.

SUMMARY OF THE INVENTION

What is desired is a simple, cost effective latch assembly and method of securing a first element, such as a cover, to a second element, such as, the top of a container, that overcomes at least some of the problems associated with the prior art. Preferably the latch assembly and method will allow for securing the cover to the top of the container in a quick and easy manner such that when the latch is in a secured position it does not project outwardly from the cover. Additionally, a preferred latching system may accommodate at least some degree of mold variance.

According to a preferred embodiment of the present invention, the latch assembly and method may be used in a grease interceptor to secure a cover of the grease interceptor to the grease interceptor's tank. Although the present invention is described and explained in the context of a grease interceptor, the present invention is not limited to grease interceptors. Instead, persons skilled in the art will recognize many other applications for the present invention where it may be necessary or desirable to releasably secure a cover to a container having an open top, to cover the open top. Non-limiting examples of other embodiments of the present invention include oil interceptors, solid waste interceptors, junction boxes (e.g. electrical junction boxes, and irrigation junction boxes), plumbing access boxes, backwater valves, re-closable containers (e.g. food containers, cargo containers, and marine containers) and compartments, re-sealable containers and compartments, and the like. All such embodiments are comprehended by the present invention.

That said, for the purposes of the present description, a preferred embodiment of the invention may include a latch assembly having two parts. By way of example, the two parts may be incorporated into the cover and a wall of the grease interceptor tank, respectively. When the cover is placed on the grease interceptor tank for securement to the grease interceptor tank, the relative positions of the two parts of the latch assembly align to allow them to cooperate together to effect releasable securement of the cover to the grease interceptor tank when manipulated by a user.

A plurality of latching assemblies may preferably be provided in a grease interceptor to provide for good securement of the cover to the grease interceptor tank, and to provide uniform compression of a compressible seal, if such a compressible seal is positioned between the cover and the grease interceptor.

Preferably, a first part of each latch assembly may comprises a latch member, and a latch member holder. The first part of each latch assembly may be incorporated in the cover, as mentioned above. The second part of each latch assembly may comprise a catch member, and be incorporated in a top edge of a wall of the grease interceptor tank. Preferably, the first parts and the second parts may be positioned in the cover and the grease interceptor tank, respectively, to be in operative alignment when the cover is placed on the grease interceptor tank for securement, to allow each of the latch assemblies to be manipulated from an unlatched configuration into a latched configuration, thereby securing the cover to the grease interceptor tank.

The latch member of the first part may include a handle portion, a pivot pin, a hook portion, and a slide portion. The latch member holder of the first part may include a pair of opposed guiding recesses for retaining the pivot pin, a stop member member(s) in the recesses for limiting movement of the pivot pin in the recess in a first direction, and a finger pocket. The second part may include a catch member for the hook portion, an abutment member for limiting movement of the pivot pin in the recess in a second direction, opposite said first direction, and a shoulder for engaging the slide portion.

In operation, the latch member is preferably free to pivot and slide in the latch member carrier in an unlatched position. When the user manipulates the latch assembly to the latched configuration by pressing down on the handle, with the cover positioned on the grease interceptor tank ready for securement to the grease interceptor tank, the interaction of the pivot pin, the guiding recesses, and the stop member(s) on the one hand, and the slide portion, the second abutment, and the shoulder on the other hand, urges the hook portion to engage the catch member.

Preferably, the latch assembly may allow for accommodating a larger degree of mold variance.

Therefore, in accordance with one aspect of the present invention, there is disclosed a latch assembly comprising: a first part for association with a first element, and a second part for association with a second element, said first and second parts being configured to cooperate with one another to releasably secure said first element to said second element; said second part having a catch member; said first part having: a latch member adapted to releasably engage said catch member when said latch member is manipulated by a user from an unlatched configuration to a latched configuration; and a latch member holder adapted to hold said latch member while allowing said latch member to pivot about a pivot axis, and slide along a sliding axis which is perpendicular to said pivot axis; wherein said latch member is manipulable into said latched configuration in a predetermined range of contiguous positions relative to said latch member holder along said sliding axis.

In accordance with another aspect of the present invention, there is disclosed a method of releasably securing a first element to a second element, said method comprising the steps of: associating a first part of a latch assembly with said first element, and associating a second part of said latch assembly with said second element, said first and second parts being configured to cooperate with one another to releasably secure said first element to said second element, said second part having a catch member, and said first part having: a latch member adapted to releasably engage said catch member when said latch member is manipulated by a user from an unlatched configuration to a latched configuration; and a latch member holder adapted to hold said latch member while allowing said latch member to pivot about a pivot axis, and slide along a sliding axis which is perpendicular to said pivot axis; and manipulating said latch member toward said latched configuration by sliding said latch member in a first sliding direction along said sliding axis, and pivoting said latch member in a first pivoting direction about said pivot axis which is perpendicular to said sliding axis; wherein said latch member is manipulable into said latched configuration in a predetermined range of contiguous positions relative to said latch member holder along said sliding axis.

BRIEF DESCRIPTION OF THE DRAWINGS

Reference will now be made to the preferred embodiments of the present invention with reference, by way of example only, to the following drawings in which:

FIGS. 23-26 are a sequence of four perspective views of a portion of the cover of FIG. 1, illustrating the removal of the latch member from the first part of one of the latch assemblies according to an embodiment of the present invention, wherein FIG. 21 shows a latch member holder releasably retaining the latch member in an initial latched configuration, FIG. 22 shows the latch member after being manipulated to an unlatched configuration, FIG. 23 shows the latch member after being released from the latch member holder, and FIG. 24 shows the latch member after being removed from the cover; and FIGS. 27-28 are a sequence of two perspective views of a portion of the cover of the inline grease interceptor of FIG. 1, illustrating a predetermined range of contiguous positions relative to the latch member holder, which may accommodate a degree of misalignment between the cover and the tank, according to an embodiment of the present invention, wherein FIG. 27 shows the latch member in a left-most position, and FIG. 28 shows the latch member in a right-most position.

DETAILED DESCRIPTION OF THE PREFERRED EMBODIMENTS

The present invention is described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

Figure 1:
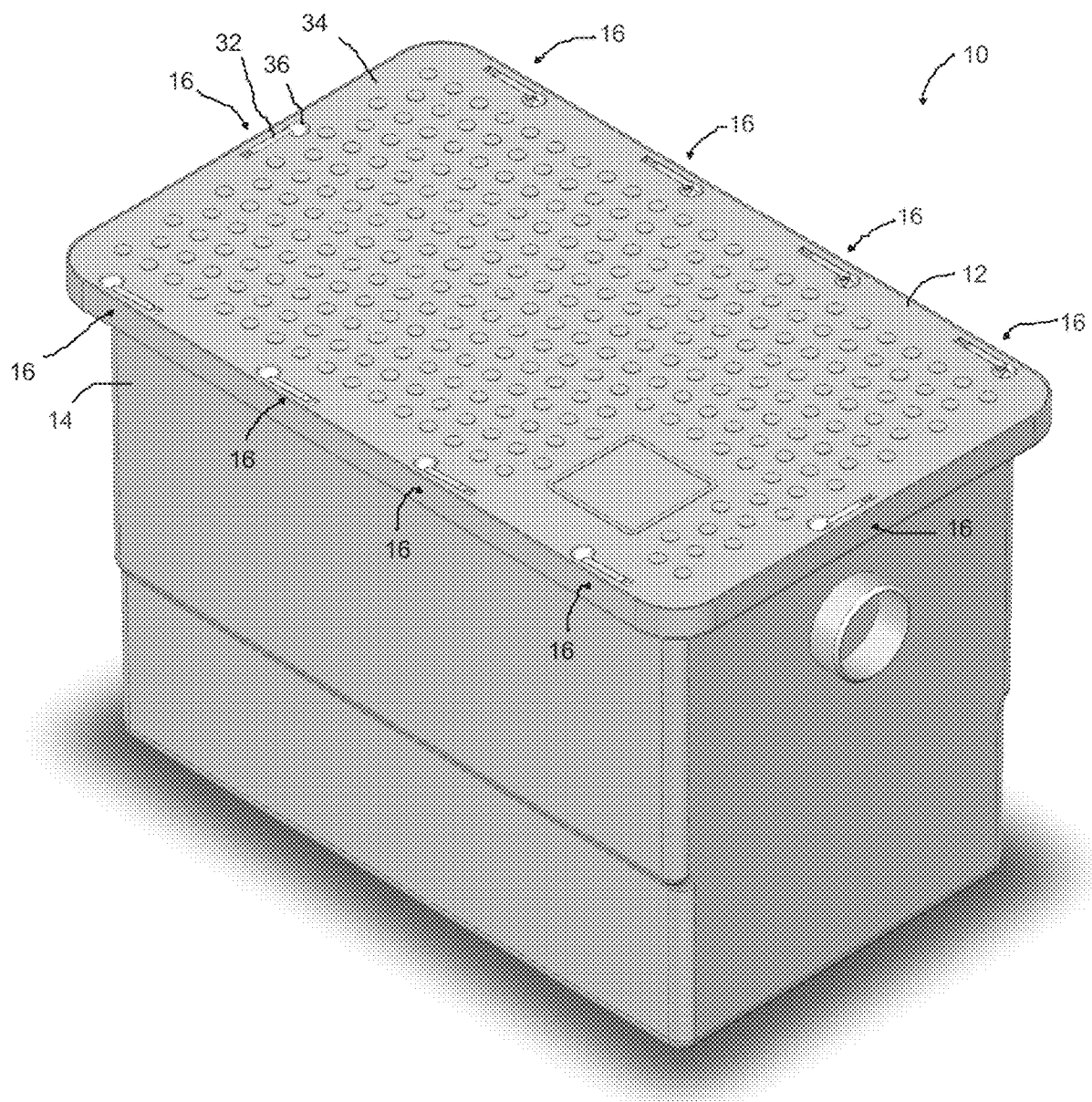
FIG. 1 is a perspective view of an inline grease interceptor with its cover secured to its tank by a plurality of latch assemblies, according to an embodiment of the present invention.

An in-line wastewater grease interceptor 10 according to an embodiment of the present invention is shown in FIG. 1. As shown, the in-line wastewater grease interceptor 10 has a cover 12 and a container, or tank 14. The cover 12 is releasably secured to the tank 14 by a plurality of latch assemblies 16. Although ten such latch assemblies 16 are shown being used in this example, it will be appreciated that more, or fewer latch assemblies 16 may be used depending on design objectives.

Figure 2:
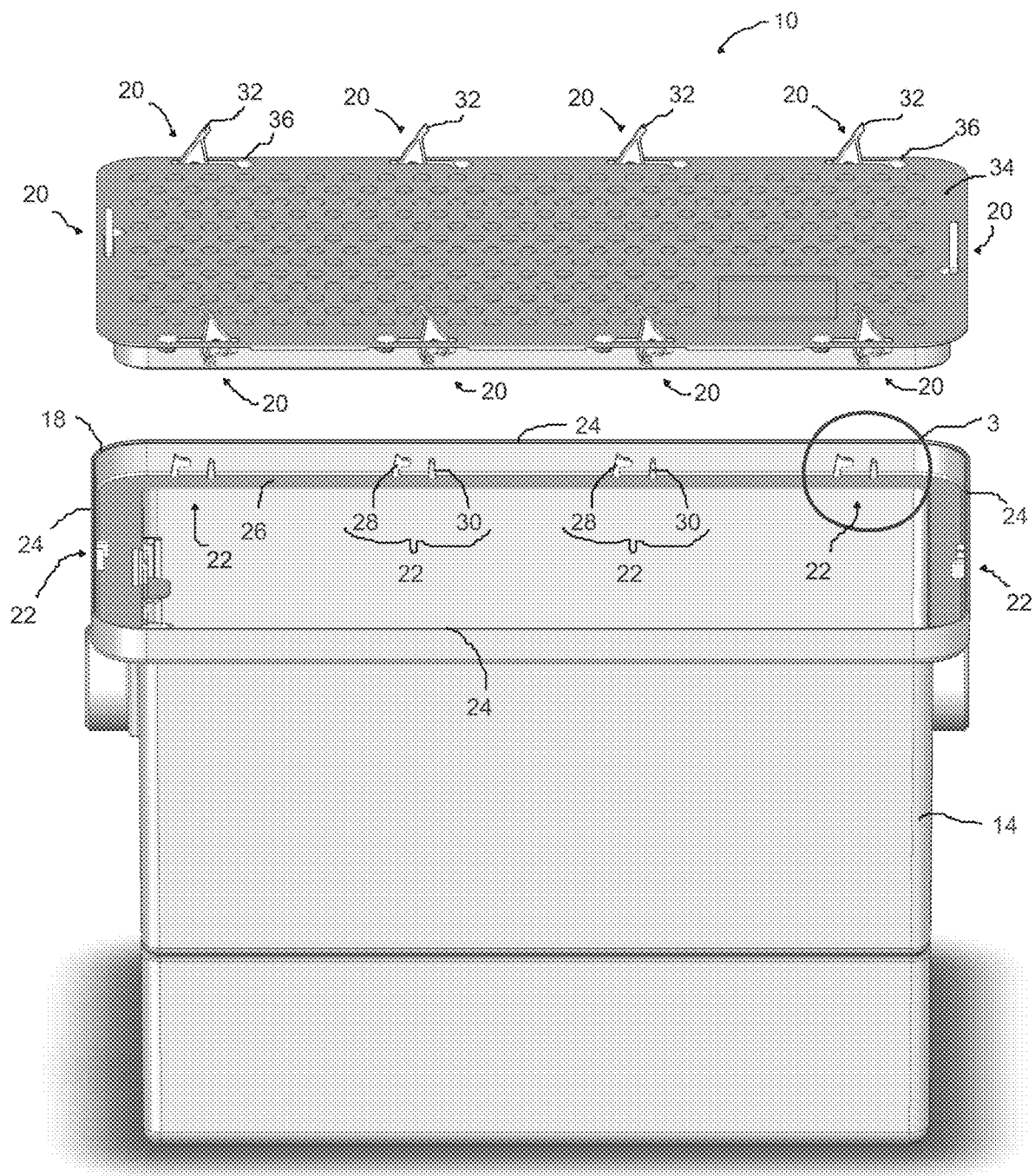
FIG. 2 is another perspective view of the inline grease interceptor of FIG. 1 prior to the cover being secured to the tank.

Referring now to FIG. 2, the cover 12 is shown above the top 18 of the tank 14 about to be secured to the tank 14. As can be seen, each latch assembly 16 has a first part 20 associated with a first element, in this case the cover 12, and a second part 22 associated with a second element, in this case the tank 14. The first and second parts 20, 22 of the latch assemblies 16 are configured to cooperate with one another to releasably secure the cover 12 to the tank 14. Although the latch assemblies 16 are shown with their first parts 20 being associated with the cover 12 and their second parts 22 being associated with the tank 14, it will be appreciated that in other embodiments, the first parts 20 may be associated with the tank 14 and the second parts 22 may be associated with the cover 12. Furthermore, some first parts 20 may be associated with the cover 12 and configured to cooperate with respective second parts 22 associated with the tank 14, while other first parts 20 may be associated with the tank 14 and configured to cooperating with respective first parts 20 associated with the cover 12. All such embodiments are comprehended by the present invention.

Figure 3:
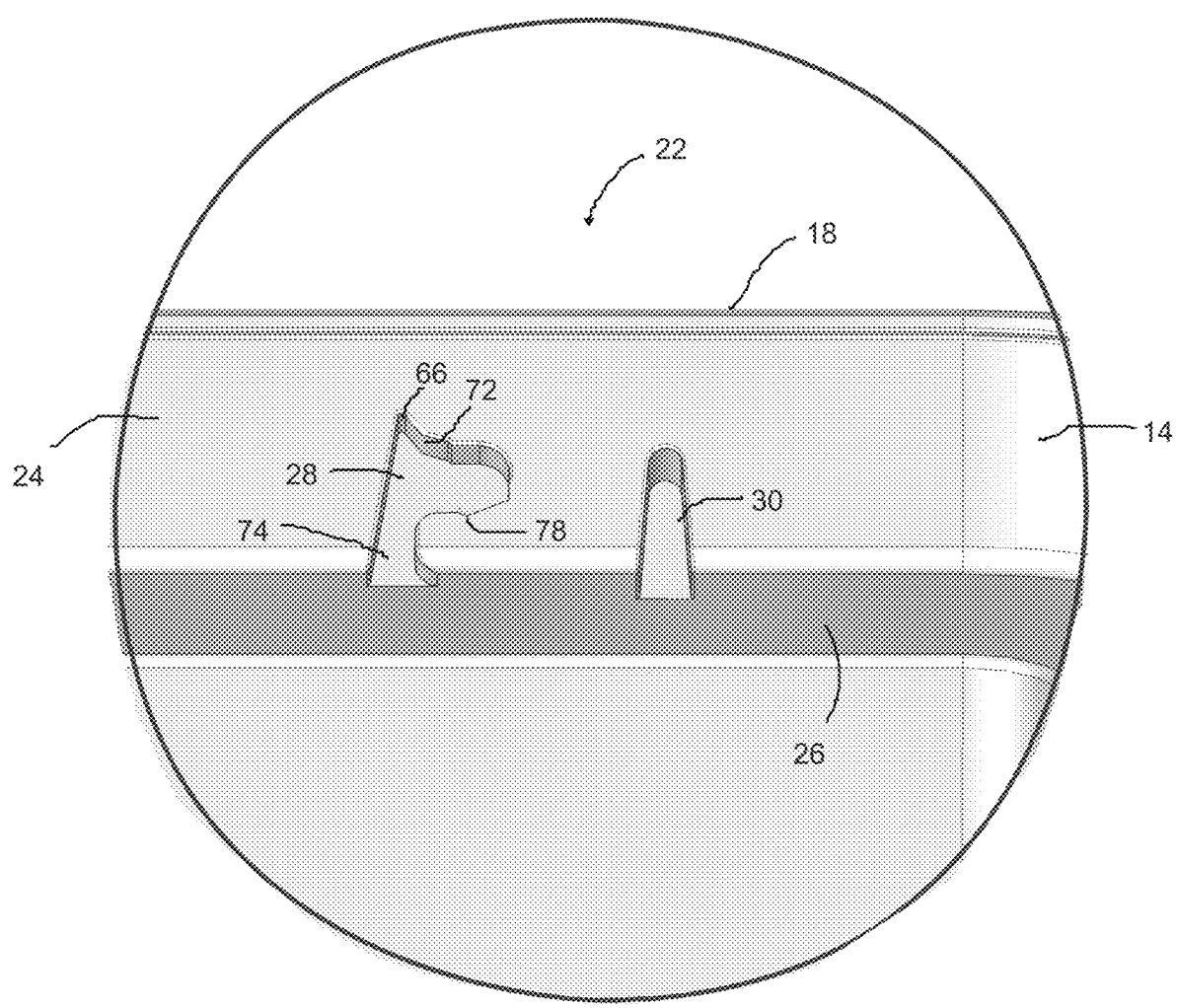
FIG. 3 is an enlarged detail of FIG. 2.

Preferably, the second part 22 of each latch assembly 16 may be provided on the walls 24 of the tank 14 at the top 18 of the tank 14. As best seen in FIG. 3, the second part 22 may preferably be molded with the tank 14, to extend from the walls 24 of the tank 14. In this example, the second parts 22 are provided on a ledge 26 about a periphery of the top 18 of the tank 14, which is configured to support the cover 12 when the cover 12 is secured to the tank 14, by the latch assemblies 16.

Each second part 22 includes a catch member 28. Preferably, each second part 22 also includes a shoulder 30, the purpose and function of which will be explained below.

It is contemplated that some embodiments may omit the ledge 26, in which case it may be sufficient for the second parts 22 to extend from the walls 24. It is also contemplated that in some embodiments, the second parts 22 may be spaced apart from the walls 24 (i.e. they do not extend from the walls 24), in which case it may be sufficient for the second parts 22 to extend upwardly from the ledge 26, toward the top 18 of the tank 14. All such embodiments are comprehended by the present invention.

Preferably, the first part 20 of each latch assembly 16 may be provided in the cover 12, positioned for cooperation with the second parts 22. Each first part 20 includes a latch member 32 adapted to releasably engage a respective catch member 28 when the cover 12 is placed on the tank 14, and the latch member 32 is manipulated by a user from an unlatched configuration (best seen in FIG. 4) to a latched configuration (best seen in FIG. 5). In this way, the latch assemblies 16 may be used to releasably secure the cover 12 to the tank 14 as shown in FIG. 6. Preferably, the latch assemblies 16 may be configured so that they will be flush with the top surface 34 of the cover, when the cover 12 is secured to the tank 14, with the latch members 32 in the latched configurations, so as not to provide an obstruction on the top surface 34 of the cover 12, that will for example present a tripping hazard.

Figure 13:
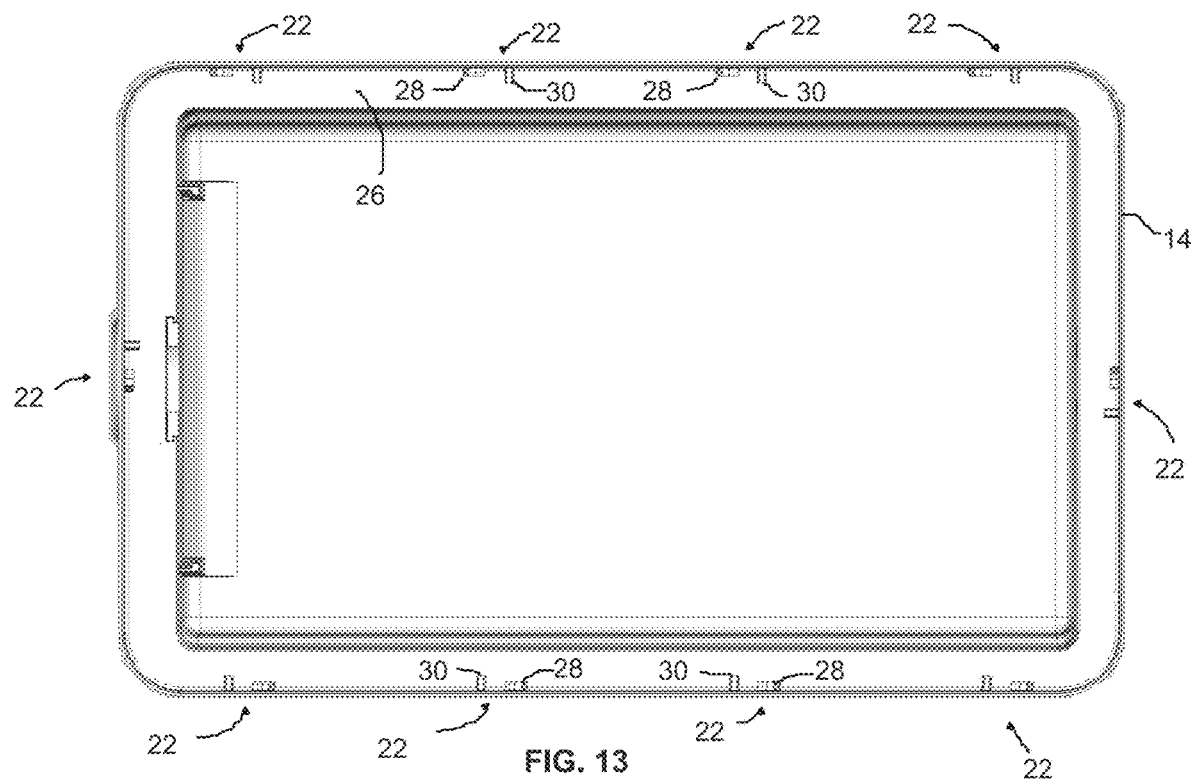
FIG. 13 is a top view of the tank of FIG. 1.
Figure 14:
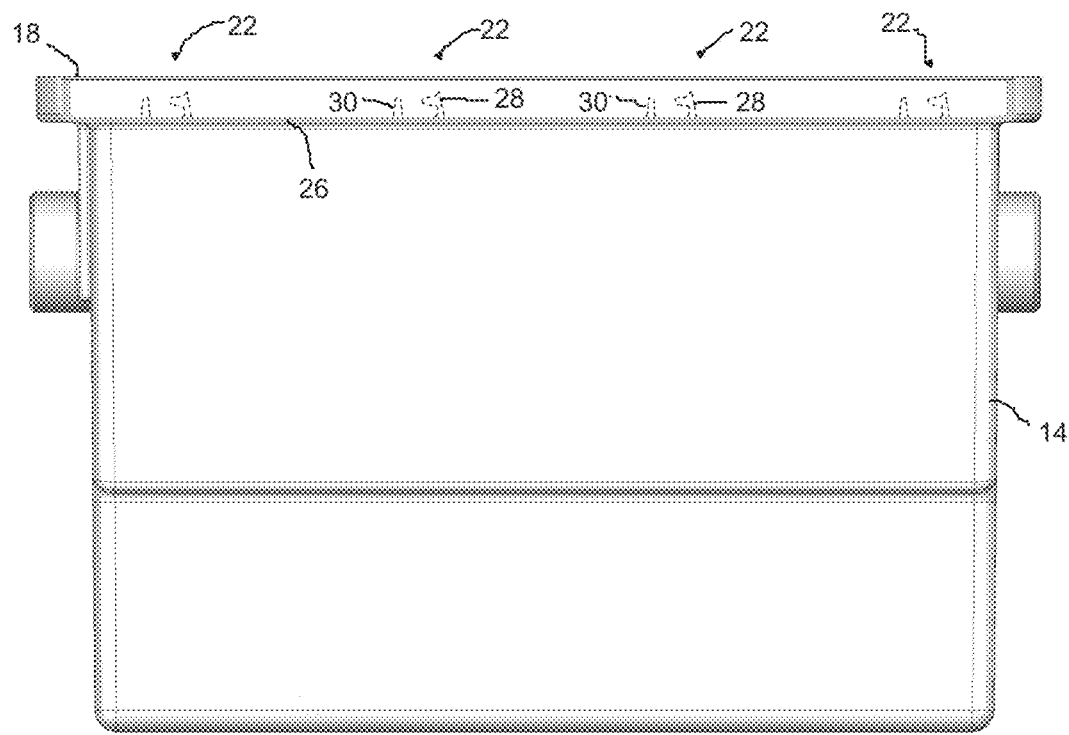
FIG. 14 is a left side view of the tank of FIG. 13.

FIGS. 7 to 12 show the first parts 20 of the latch assemblies 16 arranged with substantially even spacing about the periphery of the cover 12, according to an embodiment of the present invention. FIGS. 13 and 14 show the second parts 22 of the latch assemblies 16 arranged with substantially even spacing about the periphery of the top 18 of the tank 14 in matching relation to the first parts 20.

The latch members 32 are held in the first parts 20 of the latch assemblies 16 with latch member holders 36. Preferably, each latch member holder 36 may include an elongate aperture in the top surface 34 of the cover which is in the shape of a slot 38, and a guiding recess 40 in the side of the cover 12. Each latch member holder 36 may preferably also include a finger pocket 42 in the top surface 34 of the cover 12. Preferably, the finger pockets 42 may be sized and shaped to allow the user to grip the latch members 32 with a finger when the latch members 32 are flush with the top surface 34 of the cover 12 in their latched configurations, and manipulate them toward their unlatched configurations.

Figure 15:
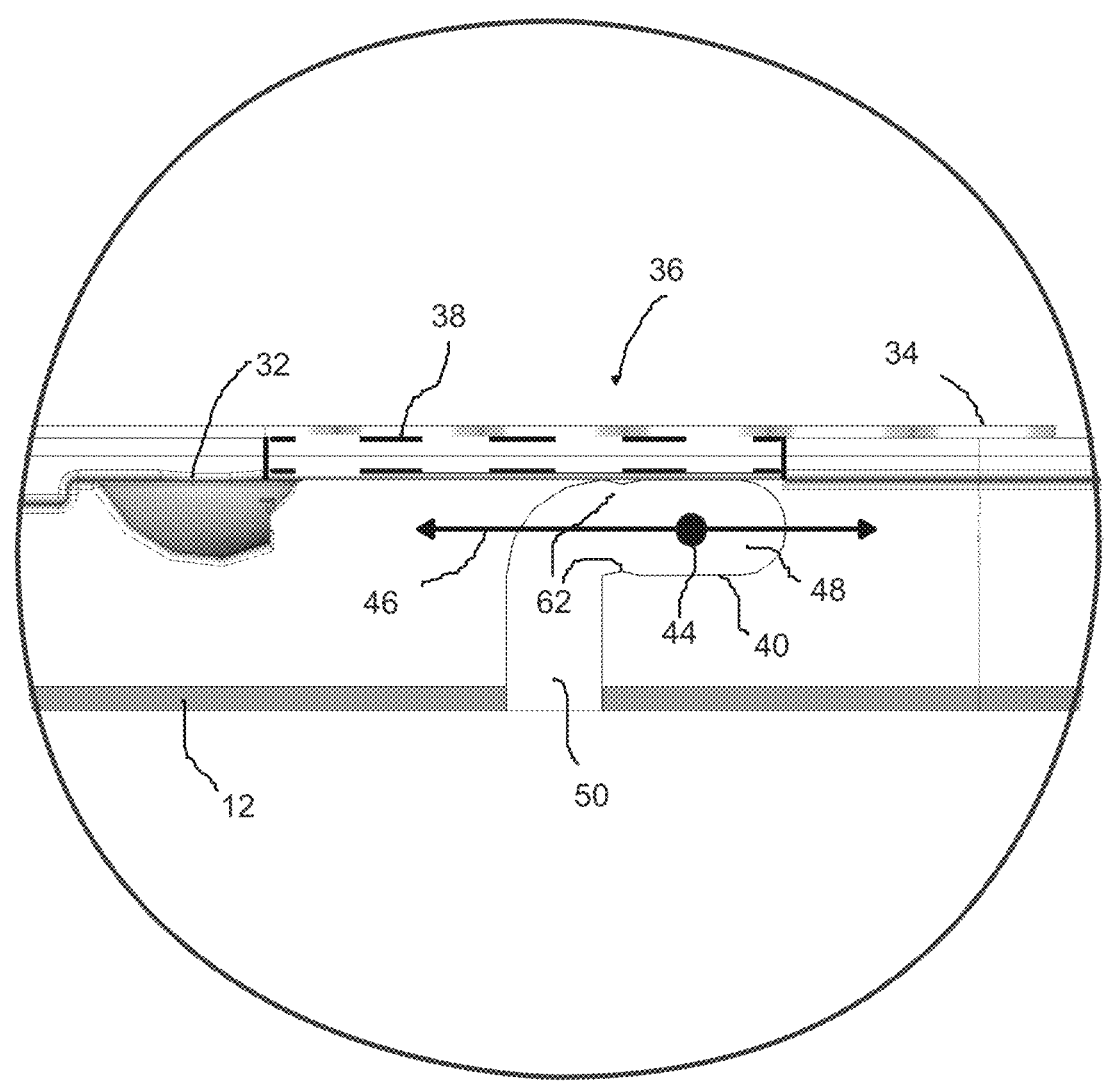
FIG. 15 is an enlarged detail of FIG. 9 showing a first part of one of the plurality of latch assemblies, with a latch member removed from the first part of the latch assembly to show a latch member holder.
Figure 16:
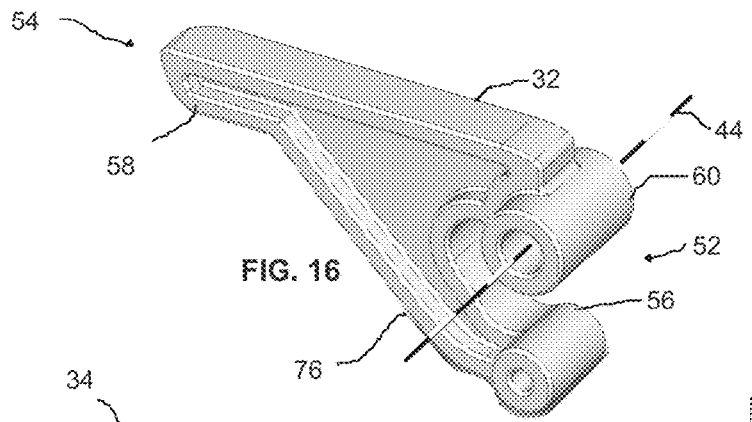
FIG. 16 is a perspective view of the latch member of FIG. 1.
Figure 17:
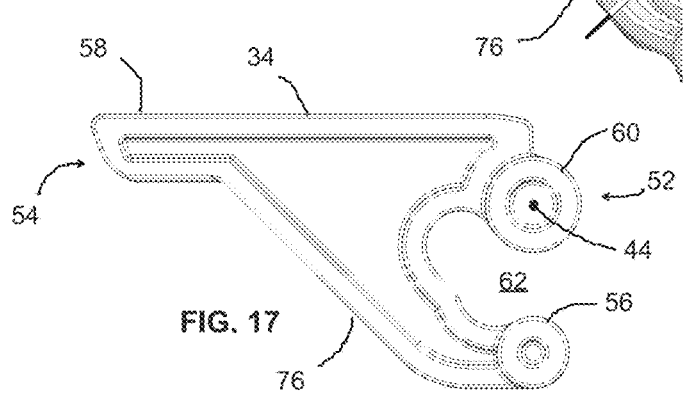
FIG. 17 is a left side view of the latch member of FIG. 16.
Figure 18:
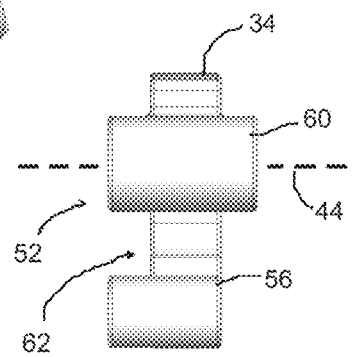
FIG. 18 is a front side view of the latch member of FIG. 16.
Figure 19:
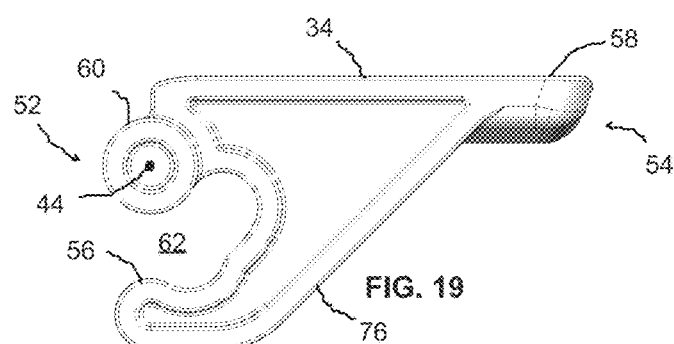
FIG. 19 is a right side view of the latch member of FIG. 16.
Figure 20:
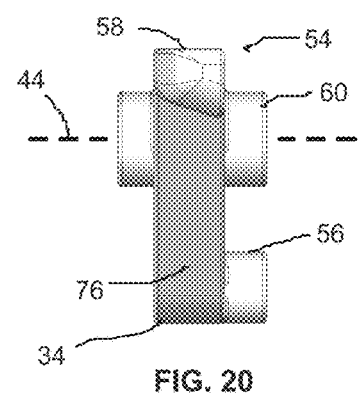
FIG. 20 is a rear side view of the latch member of FIG. 16.
Figure 21:
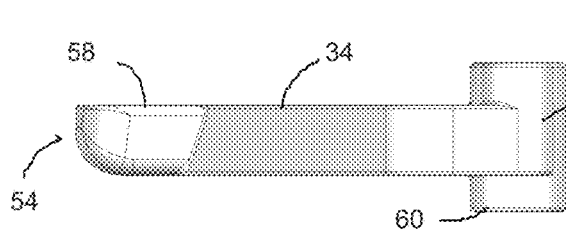
FIG. 21 is a bottom view of the latch member of FIG. 16.
Figure 22:
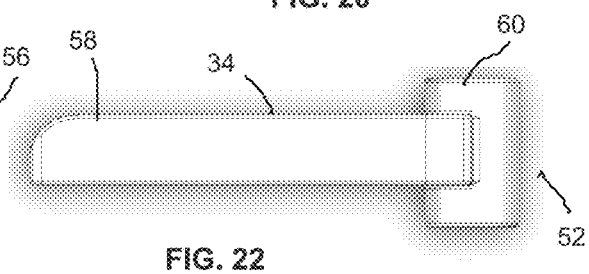
FIG. 22 is a top view of the latch member of FIG. 16.

An example of a latch member holder 36 is shown in FIG. 15, with the latch member 32 removed to allow the features of the latch member holder 36 to be seen, including a slot 38, a guiding recess 40, and a finger pocket 42. As will be described in more detail below, the latch member holders 36 are adapted to hold the latch members 32 while allowing the latch members 32 to both a) pivot about a pivot axis 44, and b) slide along a sliding 46 axis which is perpendicular to the pivot axis 44. In this example, the guiding recess 40 has a slide portion 48, defining a sliding axis 46, which is parallel to the top surface 34 of the cover 12. Extending from the slide portion 48 is a depending portion 50 for removing a worn or broken latch member 32 from the slide portion 48, or installing a new or repaired latch member 32 to the slide portion 48, which will be described in more detail below.

In this way, the latch assemblies 16 may be configured to allow the latch members 32 to be manipulable into their latched configurations in a predetermined range of contiguous positions relative to the latch member holders 36 along the sliding axis 46. This allows the first part 20 of the latch assemblies 16 to be configured to accommodate a degree of misalignment between the cover 12 and the tank 14 in the sliding axis 46. Preferably, the latch assemblies 16 may be configured to accommodate a degree of misalignment taking into account molding variances typically encountered in the molding process. By way of example, the latch assemblies 16 may be configured to accommodate a degree of misalignment between the first parts 20 in the cover 12 and the second parts in the tank 14 of up to about 10 mm. Most preferably, the latch assemblies 16 may be configured to accommodate a degree of misalignment of up to about 25 mm.

Referring now to FIGS. 16 to 22, the latch member 32 preferably may have a triangular shaped side profile, with two ends 52, 54. One end 52 of the latch member 32 has a hook portion 56, which is sized and shaped to releasably engage a respective catch member 28. The other end 54 of the latch member 32 has a handle portion 58, which is sized and shaped to be gripped and manipulated by the user with his or her fingers. The other end 54 of the latch member 32, opposite the handle portion 58, also includes a pivot pin 60, which is adapted to be slidably and pivotably retained by the latch member holder 36. Preferably, the hook portion 56 is spaced apart from the pivot pin 60, and the resulting space 62 is sized and shaped to allow the catch member 28 to snap fit between the hook portion 56 and the pivot pin 60 when the latch member 32 is manipulated into the latched configuration. Although the space 62 is shown as being substantially C-shaped, the space 62 may take on other shapes depending on design objectives.

Figure 23:
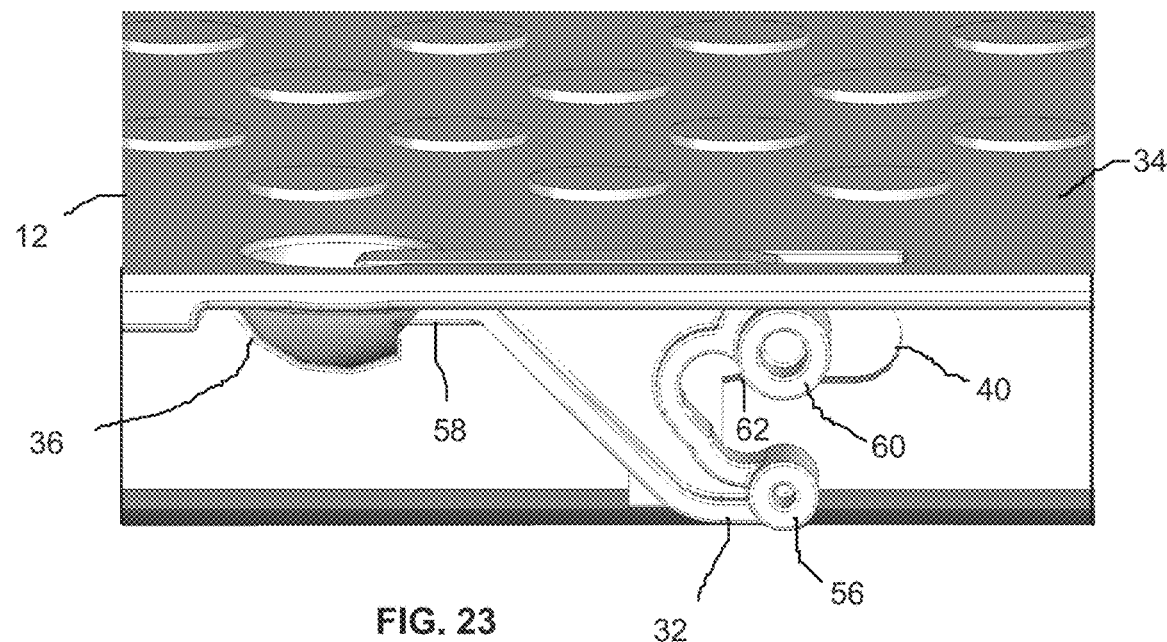
Figure 24:
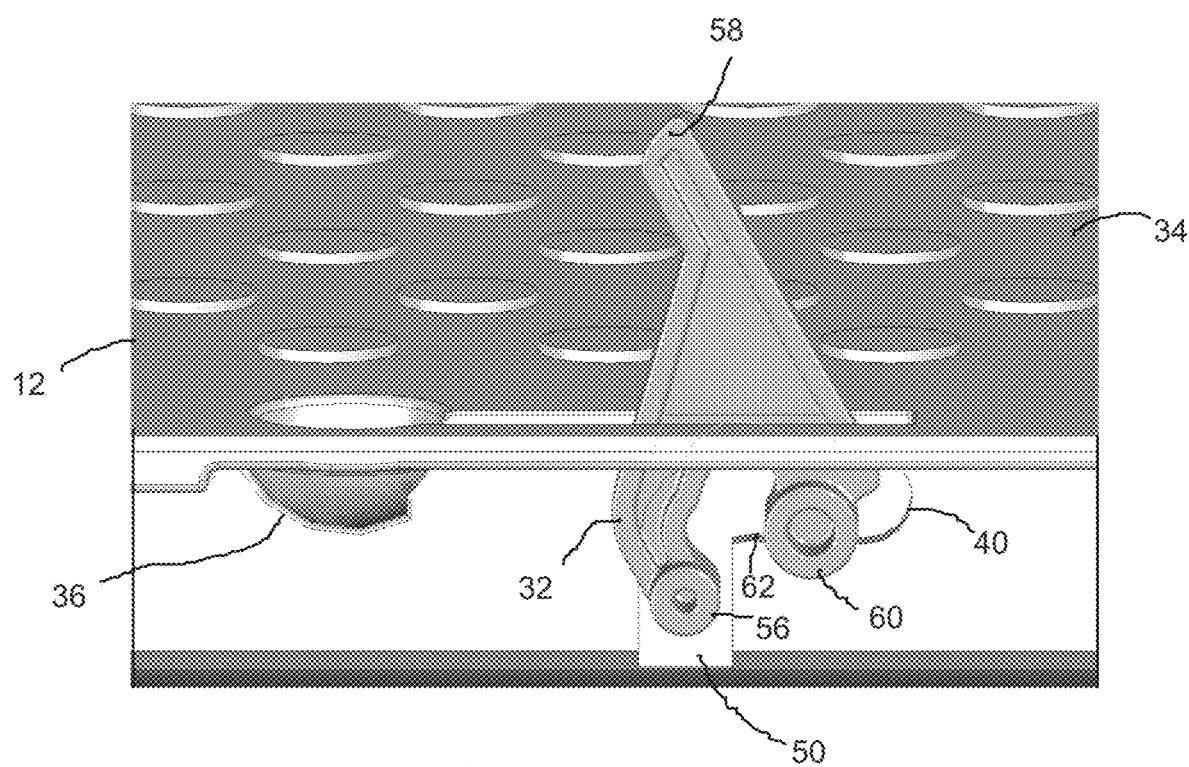

As shown in FIGS. 23 and 24, the pivot pin 60 may preferably be sized and shaped to be retained in the guiding recess 40 of the latch member holder 36 in a manner that allows the pivot pin 60, and by extension the latch member 32, to rotate and slide therein. As noted above, the pivot pin 60 defines the pivot axis 44, which is illustrated in FIGS. 16 to 22. Preferably, the latch member holder 36 of each first part may include one guiding recess 40, as shown, and the slot 38 may be configured to urge the latch member 32 to keep the pivot pin 60 retained in the guiding recess 40, thereby preventing the latch member 32 from falling out of the first part 20 when the cover 12 is removed from the tank 14. In such embodiments, although the pivot pin 60 may extend from both sides of the latch member 32, it may only be necessary for the pivot pin 60 to extend from the one side of the latch member 32 facing the guiding recess 40.

However, it is also contemplated that in some embodiments, the latch assemblies 16 may be configured with first parts 20 wherein each latch member holder 36 has a pair of opposed guiding recesses 40 (not shown), with the latch members 32 located therebetween, such that one of each pair of the opposed guiding recesses 40 is positioned on opposite sides of the latch members 32. In such embodiments, the latch members 32 may be configured so that their pivot pins 60 extend from both sides of the latch members 32 to be pivotably and slidably retained by both of the opposed guiding recesses 40. All such embodiments of the invention are comprehended by the present invention.

Preferably, the pivot pin 60 is integrally formed with the latch member 32, and may have a cylindrical shape with a diameter that is substantially uniform along the length of the pivot pin 60. However, it is contemplated that the diameter of the pivot pin 60 may be variable along its length, and even discontinuous, in some embodiments. What is important is that the latch member 32 is configured so that its pivot pin 60 may be pivotably and slidably retained in at least one guiding recess 40 of the first part 20 of the latch assembly 16, as described above.

Referring back to FIG. 15, at least one stop member 64 is preferably provided in at least one guiding recess 40 of each first part 20 of the latch assemblies 16. More preferably two stop members 64 are provided as shown. The stop members 64 help retain the pivot pin 60 of a latch member 32 in the sliding portion 48 of the guiding recess 40, by narrowing the guiding recess 40 to be smaller than the diameter of the pivot pin 60. By narrowing the portion of the guiding recess 40, the one or more stop members 64 limit the movement of the pivot pin 60 in the guiding recess 40 to the sliding portion 48.

However, as shown in the sequence of FIGS. 23 to 26 the first parts 20 of the latch assemblies 16 may preferably be configured to allow a broken or worn latch member 32 to be removed and replaced. Accordingly, the one or more stop members 64 may preferably be configured to allow the pivot pin 60 to be moved past them when a sufficient amount of force is used in the sliding axis 46, to allow the pivot pin 60 to move a) from the sliding portion 48, past the stop members 64, and into the depending portion 50, or b) from the depending portion 50, past the stop members 64, and into the sliding portion 48. Preferably, the stop members 64 and/or the pivot pin 60 may be configured to deform when a predetermined about of force is used to pull or push the pivot pin 60 through the narrow region in the guiding recess 40 defined by the stop members 64. In this way, the pivot pin 60 of the latch member 32 may be snapped out of the sliding portion 48 to allow the latch member 32 to be removed from the latch member holder 36, and snapped in to the sliding portion 48 to allow the latch member 32 to be installed in the latch member holder 36.

Figure 25:
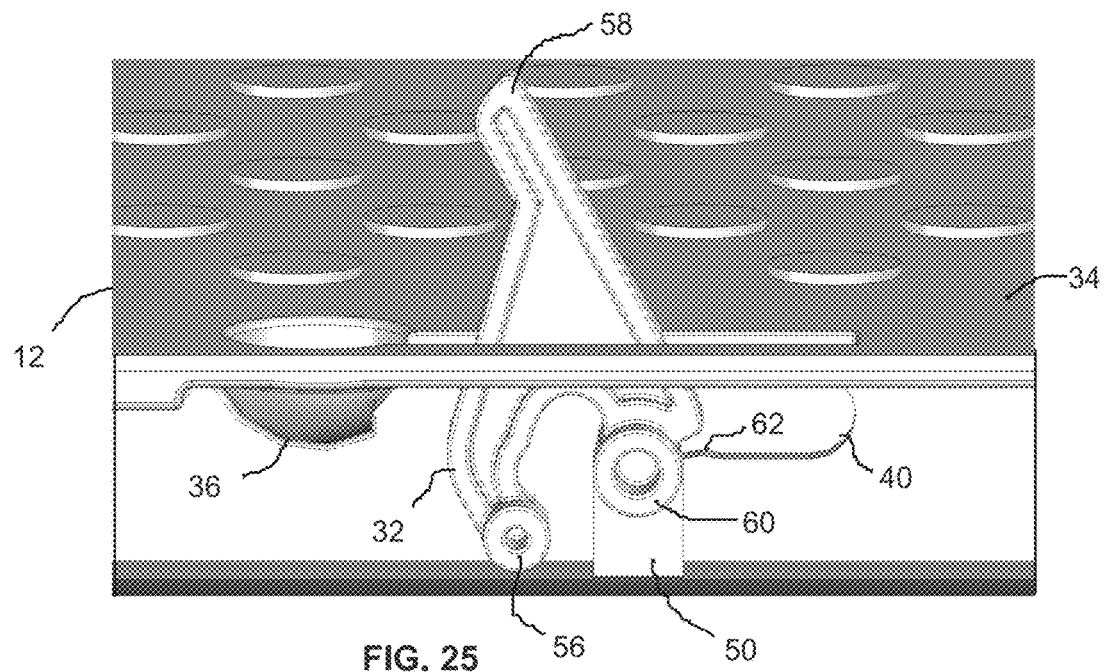
Figure 26:
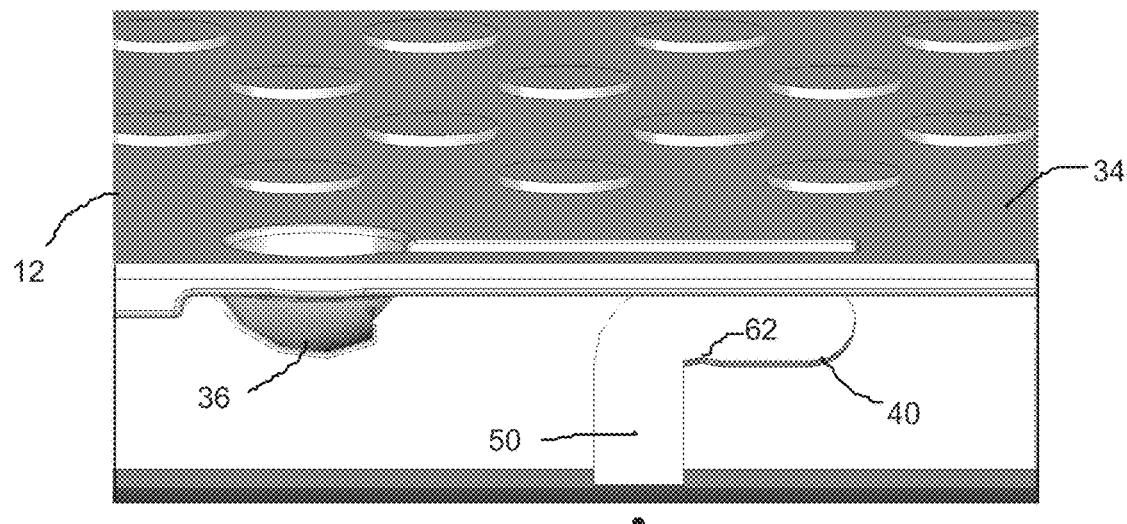
Figure 26:
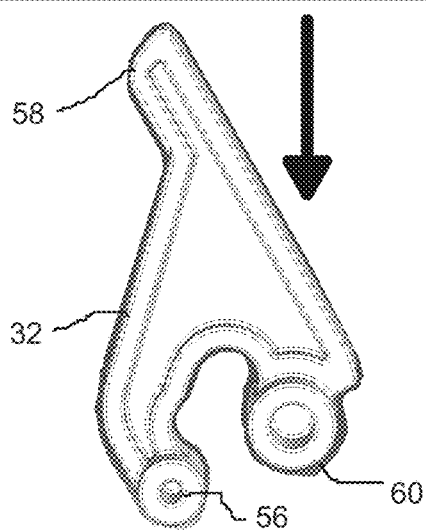

Referring now to FIG. 23 from the sequence of FIGS. 23-26, the latch member 32 is shown being held by a latch member holder 36 in a latched configuration with its pivot pin 60 retained in the sliding portion 48 of the guiding recess 40. FIG. 24 shows the latch member 32 after being manipulated by the user from the latched configuration to the unlatched configuration. By way of example, the user may have inserted the tip of his or her finger into the finger pocket 36, under the handle portion 58, and lifted the handle portion 58 upwardly to pivot the latch member 32 out of the slot 38, as shown. At this point, the pivot pin 60 is still retained in the sliding portion 48. However, enough of the latch member 32 is now exposed for the user to grip to allow him or her to slide the latch member 32 along the sliding axis 46 to manoeuver the pivot pin 32 in the sliding portion 48 to the stop members 64. Now the user may force the pivot pin 60 past the stop members 64, and out of the sliding portion 46 into the depending portion 50, as shown in FIG. 25. With the pivot pin 60 in the depending portion 50, the user may push the entire latch member 32 down through the slot 38, and out of the first part 20 of the latch assembly 16. The latch member 32, or a new or repaired latch member 32, may be reinstalled in the first part 20 of the latch assembly by reversing the above steps.

Figure 4:
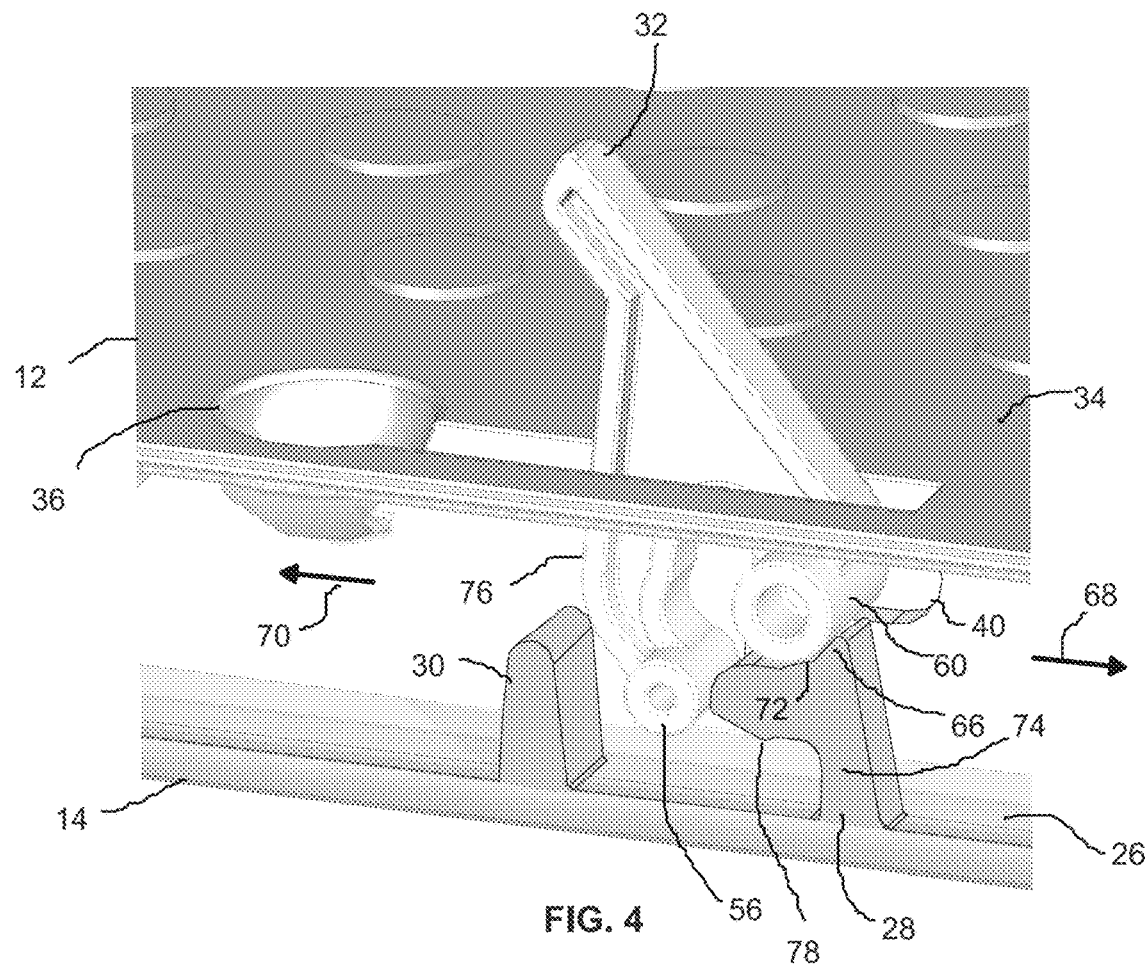
FIG. 4 is a perspective view of one of the latch assemblies of FIG. 1, showing the first part of the latch assembly cooperating with a second part of the latch assembly, according to an embodiment of the present invention, wherein a wall at the top of the tank is transparent to illustrate the latch member of the first part being in an unlatched configuration, disengaged from the catch member of the second part.

Referring back to FIGS. 4 and 5, it can now be understood that after all of the latch members 32 are manipulated to the unlatched configuration, the cover 12 may be placed on the tank 14, and secured with the latch assemblies 16 by pushing down on the handle portion 58 of each latch member 32. The first and second parts 20, 22 of the latch assemblies 16 cooperate with one another to releasably secure the cover 12 to the tank 14. In this regard, FIG. 4 shows a catch member 28 preferably including an abutment member 66, positioned above the catch member 28, for limiting movement of the pivot pin 60 in the guiding recess 40 in a first sliding direction 68 along the sliding axis 46. By way of example, the abutment members 66 may extend upwardly from the catch members 28 above a level of the guiding recesses 40 to obstruct the path of the latch member 32 in the first sliding direction 68. Preferably, the abutment members 66 obstruct the path of the hinge pins 60 of the latch members 32.

As described above, the stop members 64 preferably provided in the guiding recesses 40 are configured to limit the movement of the pivot pins 60 in a second sliding direction 70 along the sliding axis 46, opposite the first sliding direction 68. Accordingly, when manipulating the latch members 32 from their unlatched conditions to their latched conditions, the movement of the latch members 32 along their sliding axes 46 is limited by the stop members 64 on the one hand and the abutment members 70, on the other hand.

Accordingly, it can now be understood that while the latch members 32 are in their unlatched conditions, with the cover 12 placed on the tank 14 ready to be secured with the latch assemblies 16, the latch members 32 have a degree of movement, or play, along the sliding axis 46. The degree of movement of the latch members 32 is controlled by the limits placed on the movement of the pivot pins 60 in the first sliding directions 68 by the abutment members 66 on the one hand, and in the second sliding direction 70 by the one or more stop members 64 on the other hand.

Figure 5:
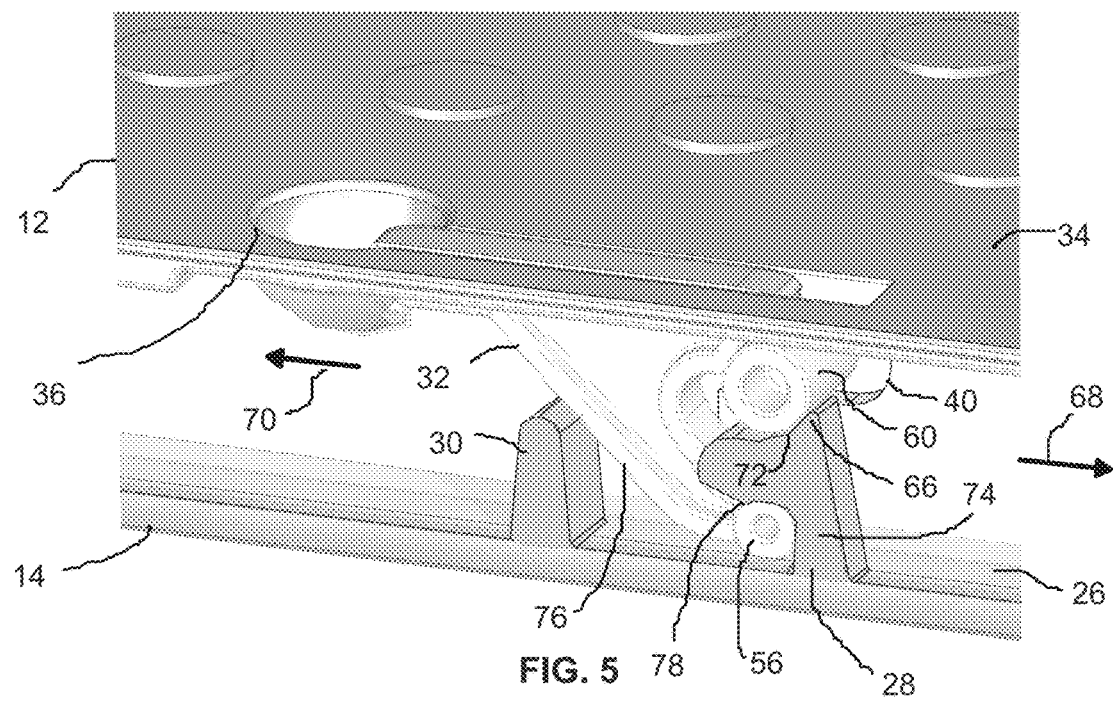
FIG. 5 is a perspective view of FIG. 5 showing the latch member in the latched configuration, releasably engaging the catch member to secure the cover to the tank.
Figure 6:
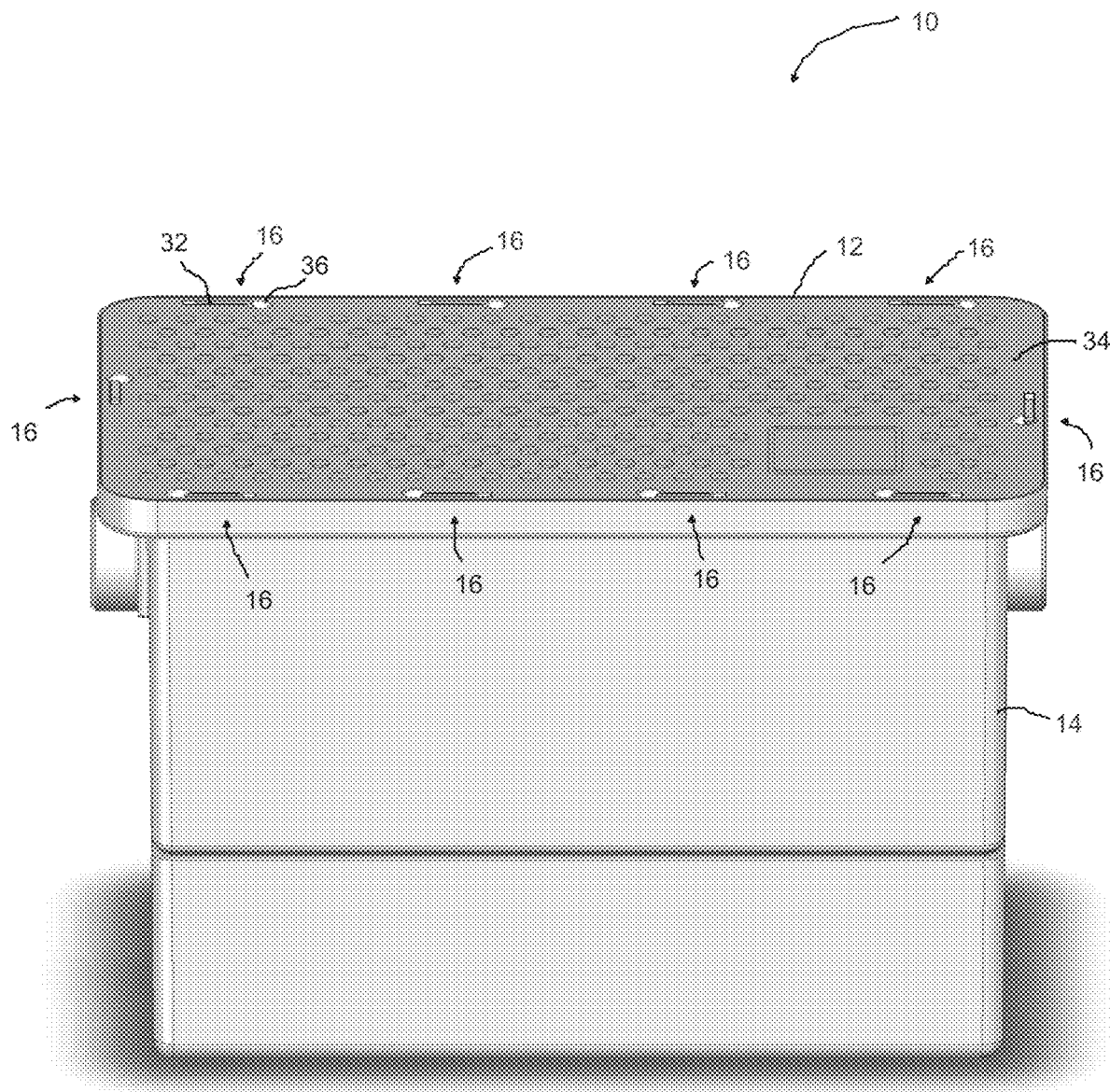
FIG. 6 is yet another perspective view of the inline grease interceptor of FIG. 1 after the cover has been secured to the tank by the plurality of latch assemblies.
Figure 7:
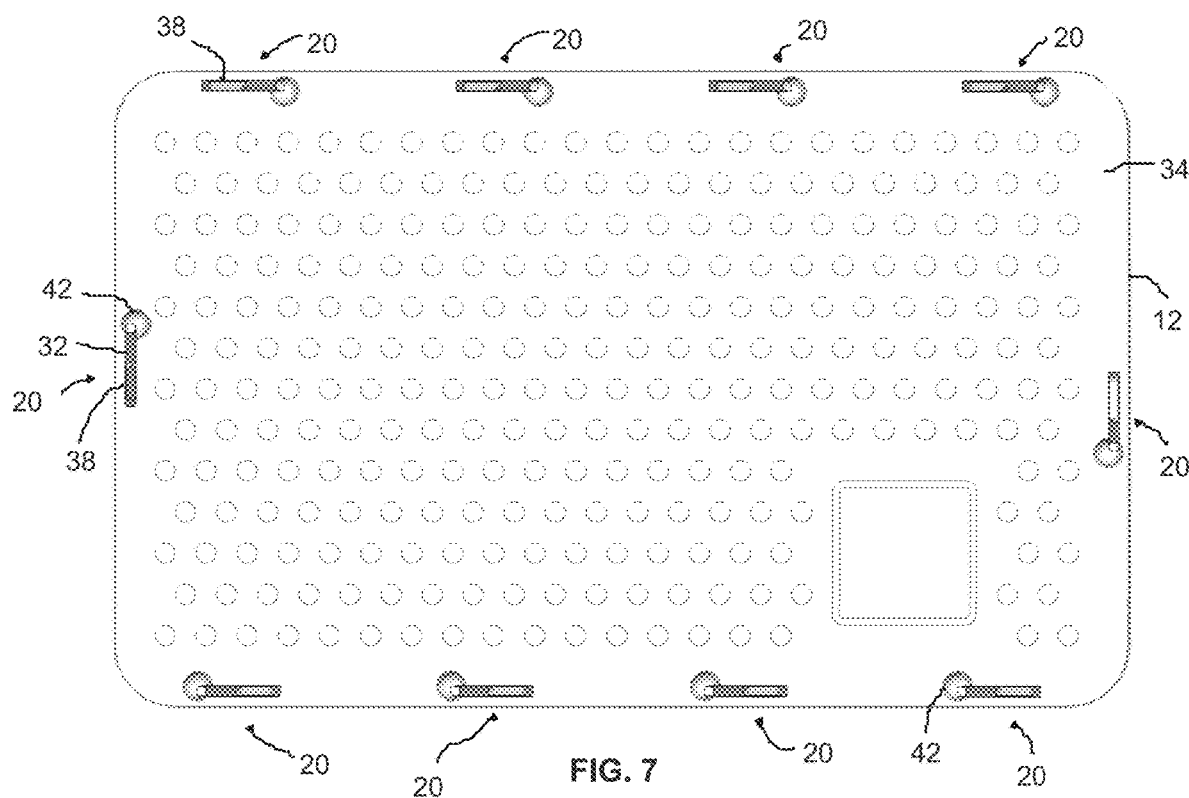
FIG. 7 is a top view of the cover of FIG. 1.
Figure 8:
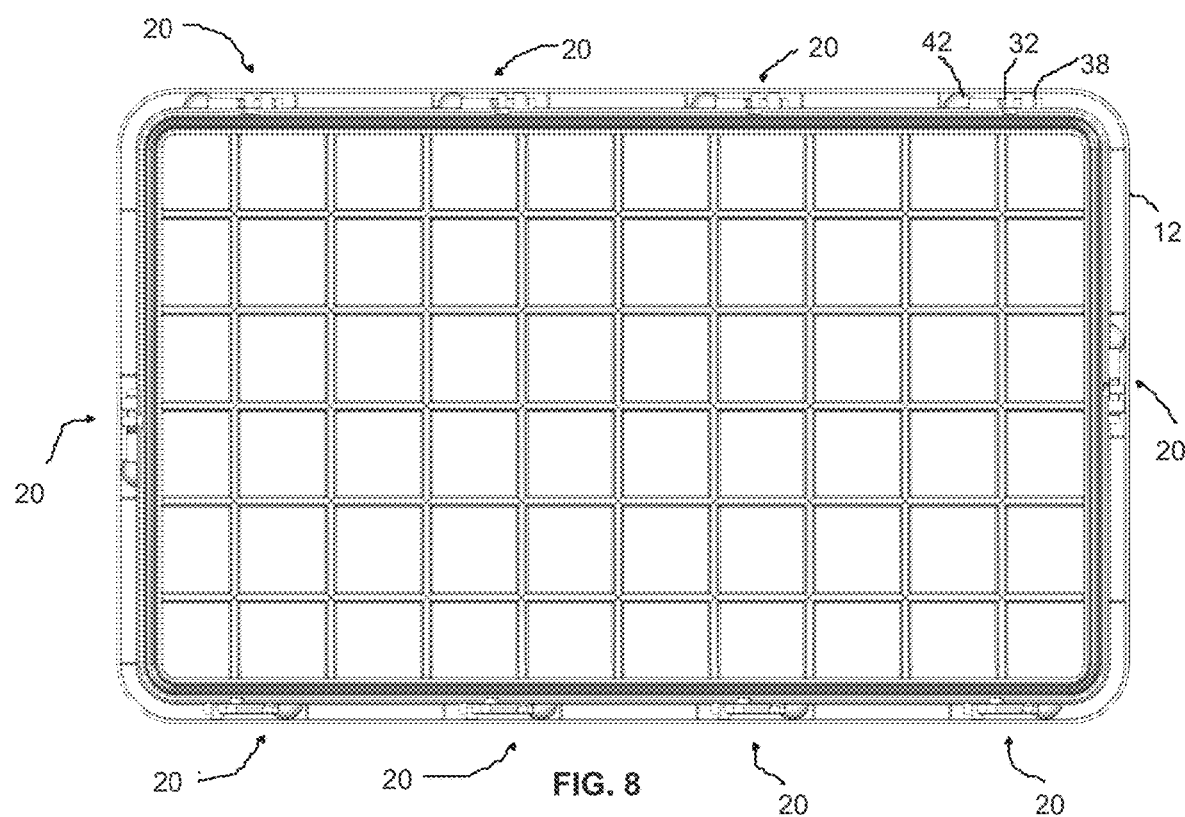
FIG. 8 is a bottom view of the cover of FIG. 7.
Figure 9:
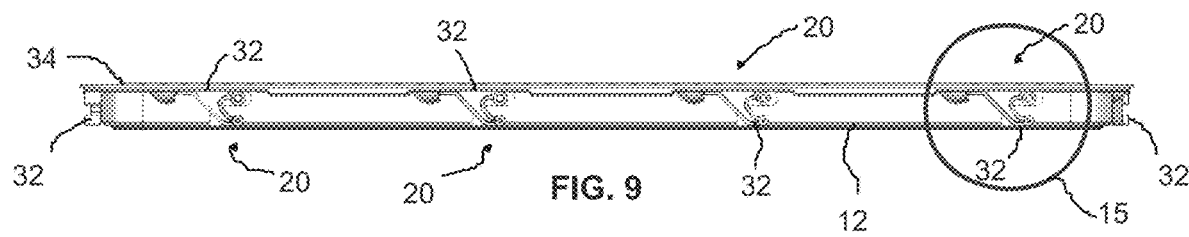
FIG. 9 is a left side view of the cover of FIG. 7.
Figure 10:
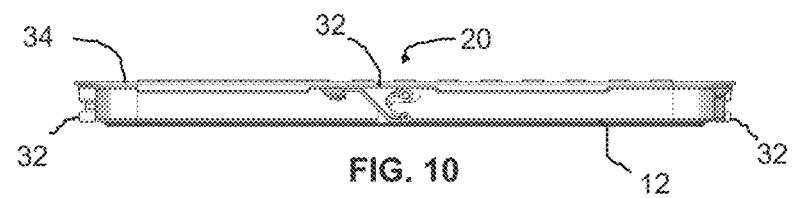
FIG. 10 is a front side view of the cover of FIG. 7.
Figure 11:
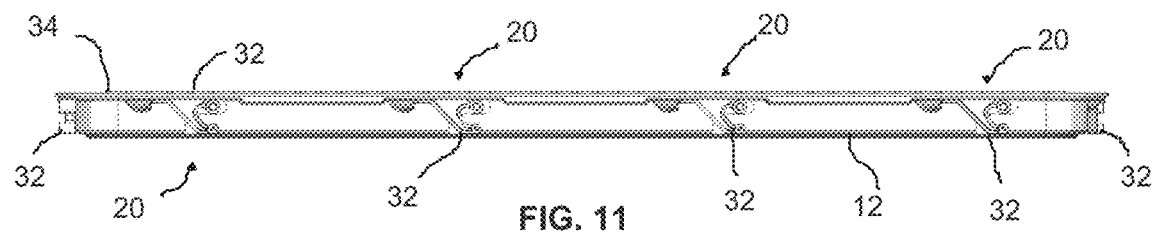
FIG. 11 is a right side view of the cover of FIG. 7.
Figure 12:
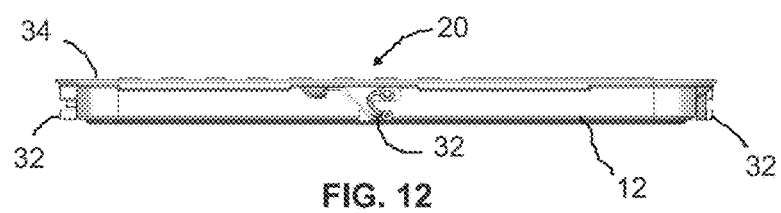
FIG. 12 is a rear side view of the cover of FIG. 7.

With continued reference to FIGS. 4 and 5, each of the abutment members 66 preferably include a pivot pin bearing surface 72, which is sized and shaped to conform to the shape of the pivot pin 60. By way of example, the pivot pin bearing surface 72 may have a curved, concave shape matching the cylindrical shape of the pivot pin 60. In this way, the pivot pin bearing surfaces 72 may facilitate the pivoting motion of the latch members 32 when manipulated by the user from their unlatched conditions to their latched conditions, and vice versa. Additionally, each pivot pin bearing surface 72, presents a fulcrum for the latch member 32, making it easier for the user to force the latch member 32 to snap its hook portion 56 into engagement with a respective catch member 28. In the unlatched condition, the latch member 32 may be moved a degree in the second direction away from the fulcrum, to the limit imposed by the one or more stop members 64. The heights of the abutment members 66, relative to the sliding portions 48 of the guiding recesses 40, may be set by attaching the catch members 28, which preferably include the abutment members 66 above, to posts 74 extending from the ledge 26 of the tank 14. In this way, the catch members 28 may be supported above the ledge 26, with the abutment members 66 positioned above the catch members 28.

Referring now to FIG. 5, the latch members 32 preferably include a slide portion 76 extending between the hook portion 56 and the handle portion 58, opposite the pivot pin 60. The slide portion 76 is configured to engage with the shoulder 30 preferably provided on the second part 22. In this way, when the user manipulates the latch member 32 by pushing down on handle portion, after placing the cover 12 on the tank 14, to pivot the latch member towards the latched configuration, the slide portion 76 engages the shoulder 30, and slides over the shoulder 30, which urges the hook portion 56 to engage the catch member 28. Preferably, a projection, such as a barb 78 may be provided on the catch member 28 to help retain the hook portion 56 in engagement with the catch member 28. What is important is that the slide portion 76 and shoulder 30 are configured to cooperate with one another, in combination with the cooperation of the pivot pin 60 and abutment member 66, to translate at least some of the downward force exerted by the user on the handle portion 56 90 degrees in the first sliding direction 68 to urge the hook portion 56 toward and into engagement with the catch member 28.

However, the slide portions 76 and the shoulders 30 are not involved when the user manipulates the latch members 32 from their latched configurations to their unlatched configurations. Instead, the cooperation of the pivot pins 60 with the abutment members 66 causes the latch members 32 to pivot when the user lifts the handle portions 58. The pivoting motion of the latch members 32 as they are manipulated from their latched configurations to their unlatched configurations causes their hook portions 56 to disengage from the catch members 28, thereby freeing the first parts 20 of the latch assemblies 16 from the second parts 22 of the latch assemblies 16, allowing the cover 12 to be removed from the tank 14.

Figure 27:
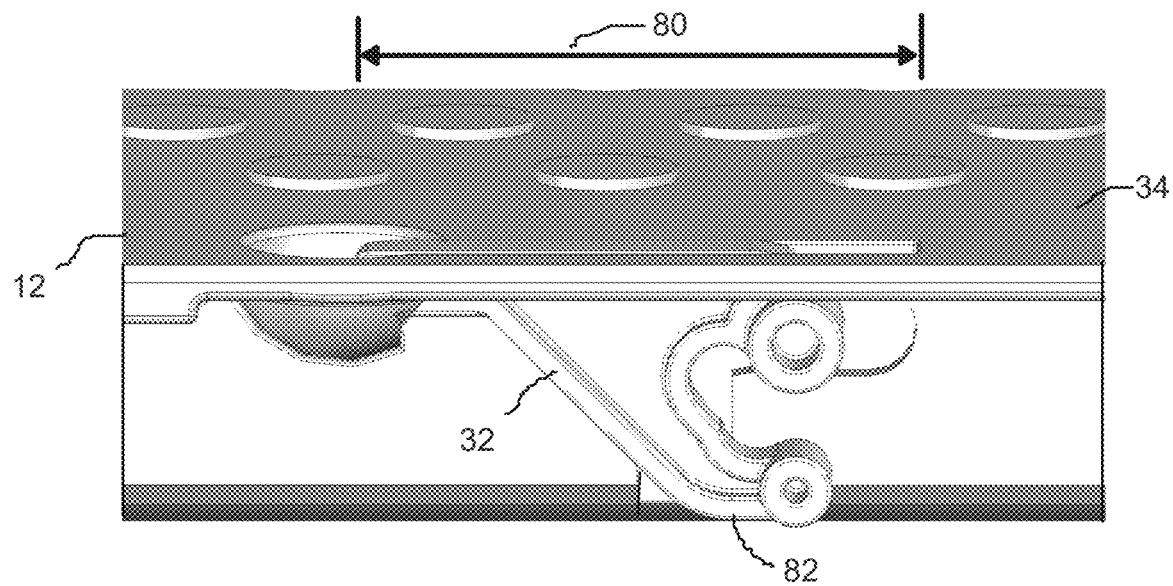
Figure 28:
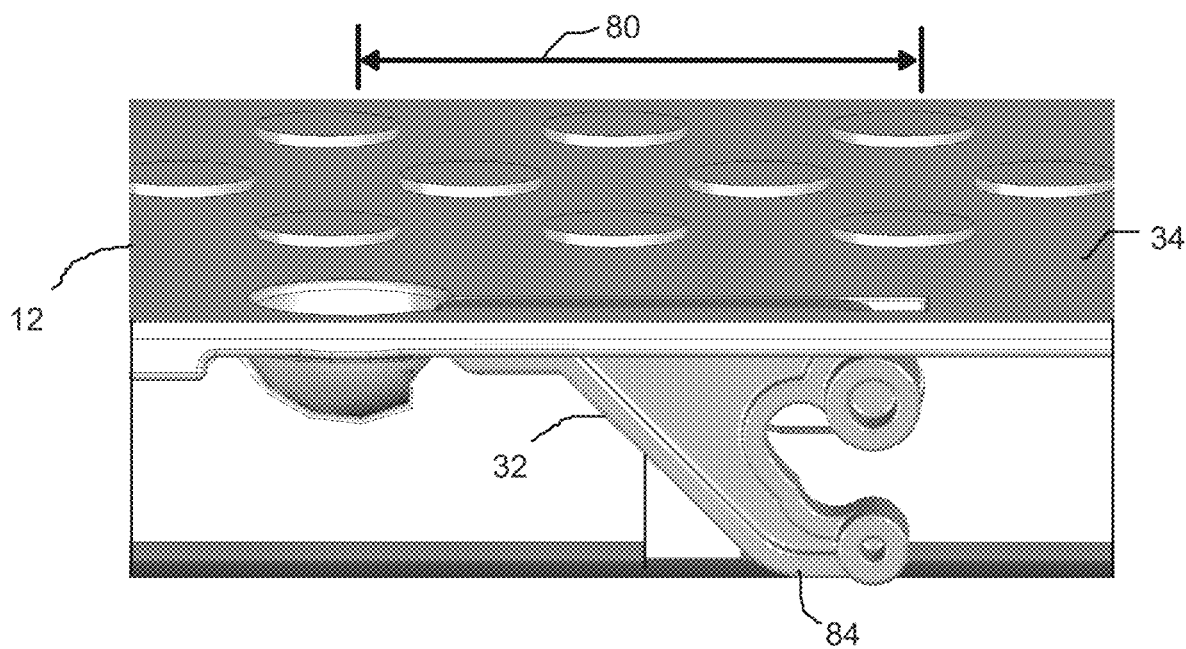

As mentioned above, because the latch members 32 are slidably held in the latch member holders 36, they can be manipulated into their latched configurations in a predetermined range of contiguous positions along the sliding axis 46. FIGS. 27 and 28, show, by way of example, a latch member 32 in two distinct positions of the latch member 32, from a range of contiguous positions, relative to the latch member holder 36 along the sliding axis 46. In particular, FIG. 27 shows the latch member 32 in a left-most position, and FIG. 28 shows the latch member 32 in a right-most position. Accordingly, it can now be understood that configuring the latch assemblies 16 to allow the latch members 32 to be manipulated to their latched conditions in a predetermined range of contiguous positions 80 relative to the latch member holder 36, as described above in accordance with preferred embodiments of the present invention, allows the latch assemblies 16 to accommodate a degree of misalignment between the cover 12 and the tank 14, of up to about 25 mm.

Although the present invention has been described in the context of a grease interceptor, persons skilled in the art will now recognize many other applications for the present invention where it may be necessary or desirable to releasably secure a first element to a second element, such as, for example, a cover to a container having an open top, to cover the open top. Non-limiting examples of other embodiments of the present invention include oil interceptors, solid waste interceptors, junction boxes (e.g. electrical junction boxes, and irrigation junction boxes), plumbing access boxes, backwater valves, re-closable containers (e.g. food containers, cargo containers, and marine containers) and compartments, re-sealable containers and compartments, and the like. All such embodiments are comprehended by the present invention.

While reference has been made to various preferred embodiments of the invention other variations, implementations, modifications, alterations and embodiments are comprehended by the broad scope of the appended claims. Some of these have been discussed in detail in this specification and others will be apparent to those skilled in the art. Those of ordinary skill in the art having access to the teachings herein will recognize these additional variations, implementations, modifications, alterations and embodiments, all of which are within the scope of the present invention, which invention is limited only by the appended claims.

What is claimed is:

1. A latch assembly comprising:
   a first part for association with a first element, and a second part for association with a second element, said first and second parts being configured to cooperate with one another to releasably secure said first element to said second element;
   said first part having a latch member with a protruding pivot pin;
   said second part having a catch member, wherein said latch member is adapted to releasably engage said catch member when said latch member is manipulated by a user from an unlatched configuration to a latched configuration; and
   at least one guiding recess having an elongated slide portion adapted to receive said pivot pin of said latch member to hold said latch member while allowing said latch member to: i. pivot about a pivot axis aligned with said pivot pin, and ii. slide along a sliding axis which is perpendicular to said pivot axis;
   wherein said latch member is manipulable into said latched configuration in a predetermined range of contiguous positions relative to said slide portion along said sliding axis; and
   wherein said pivot axis is movable relative to said first part.

2. The latch assembly as claimed in claim 1, wherein one of said first element and said second element is a cover, and the other of said first element and said second element is a container.

3. The latch assembly as claimed in claim 2, wherein said cover and container form at least part of a grease interceptor, an oil interceptor, a solid waste interceptor, a junction box, a plumbing access box, a backwater valve, a re-closable container, a re-closable compartment, a re-sealable container, or a re-sealable compartment.

4. The latch assembly as claimed in claim 2, wherein said sliding axis is parallel to a top surface of said cover.

5. The latch assembly as claimed in claim 2, wherein said first part is configured to accommodate a degree of misalignment between said cover and said container in said sliding axis.

6. The latch assembly as claimed in claim 5, wherein said degree of misalignment is up to about 25 mm.

7. The latch assembly as claimed in claim 6, wherein said degree of misalignment is up to about 10 mm.

8. The latch assembly as claimed in claim 1, wherein said latch member has two ends; and wherein said latch member comprises a hook at one of said ends for said releasably engaging said catch member, and a handle at the other of said ends for said manipulation by said user.

9. The latch assembly as claimed in claim 1, wherein the first part further comprises a finger pocket sized and shaped to allow said user, with a finger, to grip said latch member when in said latched configuration.

10. The latch assembly as claimed in claim 1, wherein said at least one guiding recess comprises a pair of opposed guiding recesses to allow said pivot pin to rotate and slide therein.

11. The latch assembly as claimed in claim 10, further comprising a stop member positioned in at least one of said opposed guiding recesses to limit movement of said pivot pin in said opposed guiding recesses in a second sliding direction along said sliding axis.

12. The latch assembly as claimed in claim 11, further comprising an abutment member positioned on said second part for limiting movement of said pivot pin in said opposed guiding recesses in a first sliding direction along said sliding axis, opposite said second sliding direction.

13. The latch assembly as claimed in claim 12, further comprising a post extending from said second part, wherein said abutment member and said catch member are attached to said post.

14. The latch assembly as claimed in claim 12, wherein said abutment member presents a fulcrum for said handle portion of said latch member, above said catch member.

15. The latch assembly as claimed in claim 14, wherein said fulcrum comprises a pivot pin bearing surface.

16. The latch assembly as claimed in claim 15, wherein said pivot pin bearing surface has a curved concave shape sized and shaped to conform to a shape of said pivot pin.

17. The latch assembly as claimed in claim 15, wherein said latch member comprises a handle portion, a hook portion, and a slide portion;
   wherein said slide portion extends between said hook portion and said handle portion, opposite said pivot pin;
   wherein said second part further comprises a shoulder configured to engage said slide portion when said latch member is manipulated to pivot towards said latched configuration; and
   wherein said engagement of said shoulder by said slide portion urges said hook portion to engage said catch member.

18. The latch assembly as claimed in claim 17, wherein said latch member has a substantially triangular shaped side profile.

19. The latch assembly as claimed in claim 15, wherein said latch member comprises a hook portion spaced apart from said pivot pin, said space being sized and shaped to allow said catch member to snap fit between said hook portion and said pivot pin when said latch member is manipulated into said latched configuration.

20. The latch assembly as claimed in claim 19, wherein said space is substantially C-shaped.

21. The latch assembly as claimed in claim 15, wherein said second sliding direction is away from said fulcrum.

22. The latch assembly as claimed in claim 1, wherein said pivot pin extends outwardly from at least one side of said latch member.

23. The latch assembly as claimed in claim 22, wherein said pivot pin extends outwardly from both sides of said latch member.

24. The latch assembly as claimed in claim 1, wherein said pivot pin has a diameter, and said diameter is one of a) substantially uniform along a length of said pivot pin, and b) substantially variable along said length of said pivot pin.

25. The latch assembly as claimed in claim 1, wherein said range of contiguous positions comprises at least two distinct positions relative to said slide portion along said sliding axis.

26. The latch assembly as claimed in claim 1, wherein said pivot pin is integral with said latch member.

27. A method of releasably securing a first element to a second element, said method comprising the steps of:
  associating a first part of a latch assembly with said first element, and associating a second part of said latch assembly with said second element, said first and second parts being configured to cooperate with one another to releasably secure said first element to said second element, said second part having a catch member, and said first part having:
    a latch member adapted to releasably engage said catch member when said latch member is manipulated by a user from an unlatched configuration to a latched configuration; and
    a pivot pin protruding from said latch member, wherein at least one guiding recess is provided adjacent to said latch member having an elongated slide portion adapted to receive said pivot pin of said latch member to retain said latch member while allowing said latch member to: i. pivot about a pivot axis aligned with said pivot pin, and ii. slide along a sliding axis which is perpendicular to said pivot axis; and
  manipulating said latch member toward said latched configuration by sliding said latch member in a first sliding direction along said sliding axis, and pivoting said latch member in a first pivoting direction about said pivot axis which is perpendicular to said sliding axis;
  wherein said latch member is manipulable into said latched configuration in a predetermined range of contiguous positions relative to said slide portion along said sliding axis; and
  wherein said pivot axis is movable relative to said first part.

28. The method as claimed in claim 27, further comprising the steps of:
  manipulating said latch member toward said unlatched configuration by pivoting said latch member about said pivot axis in a second pivoting direction, opposite said first pivoting direction, and sliding said latch member along said sliding axis, in a second sliding direction, opposite said first sliding direction.

29. The method as claimed in claim 27, wherein one of said first element and said second element is a cover, and the other of said first element and said second element is a container.

30. The method as claimed in claim 29, wherein said cover and container form parts of a grease interceptor.

31. The method as claimed in claim 29, wherein said sliding axis is parallel to a top surface of said cover.

32. The method as claimed in claim 29, wherein said first part is configured to accommodate a degree of misalignment between said cover and said container in said sliding axis.

33. The method as claimed in claim 32, wherein said degree of misalignment is up to about 25 mm.

34. The method as claimed in claim 33, wherein said degree of misalignment is up to about 10 mm.

35. The method as claimed in claim 28, further comprising the step of limiting movement of said latch member in said second sliding direction along said sliding axis with a stop member positioned on said first part.

36. The method as claimed in claim 28, further comprising the step of limiting movement of said latch member in said first sliding direction along said sliding axis, opposite said second sliding direction with an abutment member positioned on said second part.

37. The method as claimed in claim 36, further comprising the step of using said abutment member as a fulcrum for said latch member to pivot against, to allow said user to lever said latch member to or from said latched and unlatched configurations.

38. The method as claimed in claim 36, wherein said latch member comprises a handle portion, a hook portion, and a slide portion extending between said hook portion and said handle portion, and said method further comprises the step of:
  using said slide portion to urge said hook portion to engage said catch member by forcing said slide portion against a shoulder on said second part, said shoulder being configured to engage said slide portion when said latch member is manipulated towards said latched configuration.

39. The method as claimed in claim 36, wherein said latch member comprises a hook portion spaced apart from said pivot pin, said method further comprising the step of:
  snap fitting said latch member to said catch member, with said catch member located in said space between said hook portion and said pivot pin when said latch member is manipulated into said latched configuration.

40. The method as claimed in claim 39, wherein said latch member is releasably retained by the pivot pin engaging the slide portion; and wherein said method further comprises the step of removing a worn or broken latch member from said at least one guiding recess and replacing said worn or broken latch member with a replacement latch member.

* * * * *